Oct. 30, 1951 L. M. C. SEAMARK 2,573,225
SEALING PACKING

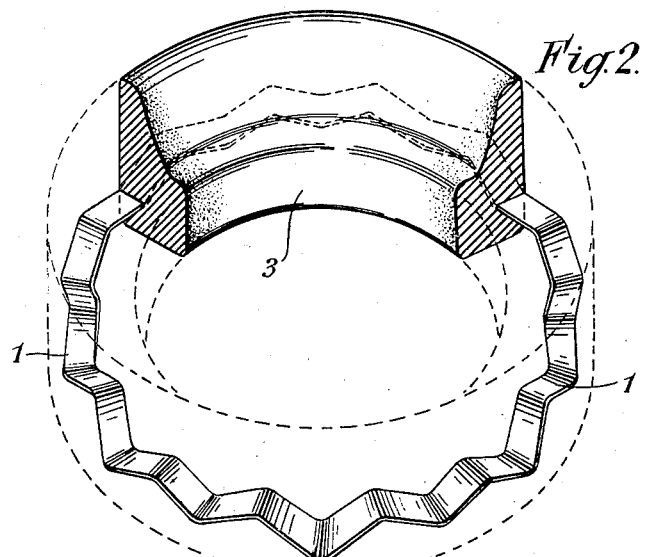
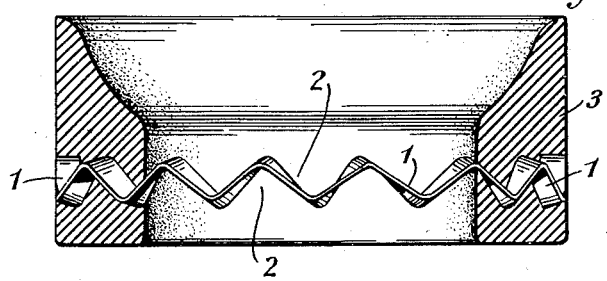
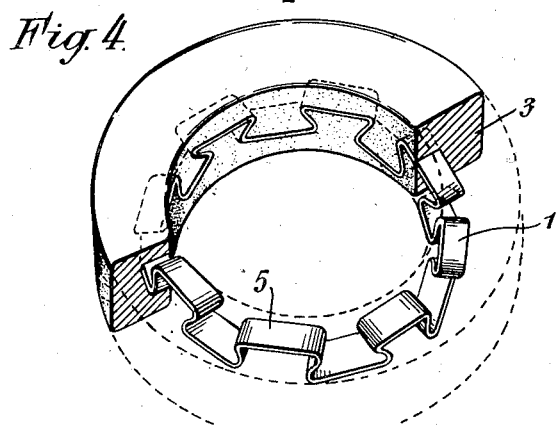
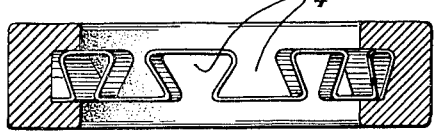

Filed Dec. 16, 1946 2 SHEETS—SHEET 2

Inventor
LEWIS MERVYN CECIL SEAMARK by
W. E. EVANS,
Attorney.

Patented Oct. 30, 1951

2,573,225

UNITED STATES PATENT OFFICE 2,573,225

SEALING PACKING

Lewis Mervyn Cecil Seamark,
Lyne Regis, England

Application December 16, 1946, Serial No. 716,485
In Great Britain December 17, 1945

5 Claims. (Cl. 288—9)

The invention relates to sealing packing and has among its objects to reinforce packing of U, lip or other section, such as is usually employed with pistons or rods and cylinders or glands, so as to avoid the formation of an external annulus behind the flexible packing as commonly occurs in its use.

It is common experience that such external annulus develops in the use of such flexible packing at a position between the end of the packing at which pressure is applied, and the opposite end at which no pressure is accessible, and that wear of the packing is consequently caused by reason of the pressure imposed upon the packing tending to move it towards the non-pressure side in the annular space between the piston or rod and the cylinder or gland. In cases where consequent wear is excessive the effective life of the packing is considerably reduced.

Furthermore in the application of such packing to pumps or other apparatus through which fluids are passed that carry abrasive particles in suspension the particles frequently become embedded in the lip or sealing edge of the flexible packing and cause excessive wear; while in situations in which a flexible sealing packing of rubber or similar soft deformable material is employed, the pressure opposing the piston is transmitted through the lip of the flexible sealing packing or ring into the bore of the cylinder, causing excessive wear or loss of efficiency by reason of the friction imposed.

According to the invention a reinforcement for a sealing packing of rubber or similar soft deformable material is provided as a ring of metal, or material having comparable physical characteristics which is conveniently formed from a strip or band which is pressed or corrugated to a wave form to present a lengthwise series of transverse cavities or corrugations, advantageously of a substantially V shape in lengthwise section, whereby the recesses on one face of the strip or band alternate with recesses on the other face, and the strip or band may thus be formed into endless rings. The rings may be moulded in the end or ends of the flexible material of the packing, or in interposed positions. Thus if pressure be imposed laterally upon such a ring the pressure tends to flatten out the recesses or corrugations and thus to reduce their depth, and the external diameter of the ring is thus increased. This increase in diameter may continue until the outer edge of the ring comes into contact with the bore of the cylinder or gland and thus closes the annular space between the piston or rod and the cylinder or gland, so that thus effective support is given by the ring to the sealing packing in a pressure-tight condition.

In cases where a contraction of the internal diameter of the flexible packing takes place, as for example by a rod extending through a gland, a similar ring may be formed from a strip or band of metal, or material of comparable physical characteristics, but instead of corrugations or recesses of uniform cross-sectional form being provided in a transverse series lengthwise of the strip or band, the strip or band may be pressed or formed to provide a transverse series of alternate oppositely directed recesses of a dove-tail cross-section, whereby the alternate recesses having flat bases, the recesses being directed alternately towards the internal and external peripheries of the ring.

According to the invention furthermore where desired both an expanding and a contracting ring may be provided as a reinforcement in the same packing. The ring formed from a strip or band of metal may be provided with its outer edge—in the case of an expanding ring—and with its inner edge—in the case of a contracting ring—in the outer and inner peripheral surfaces of contact respectively of the packing of rubber or similar elastic material.

The invention is diagrammatically illustrated by way of example in the accompanying drawings.

Figure 1 is a transverse section of a sealing packing of lip section according to the invention, showing the reinforcement in perspective, for use where an expanding packing is required.

Figure 2 is a corresponding perspective view from above, partly in section.

Figure 3 is a transverse section of a packing according to the invention showing the reinforcement in perspective, for use where contraction of the packing is required, and Figure 4 is a corresponding perspective view from above, partly in section.

Figure 5:
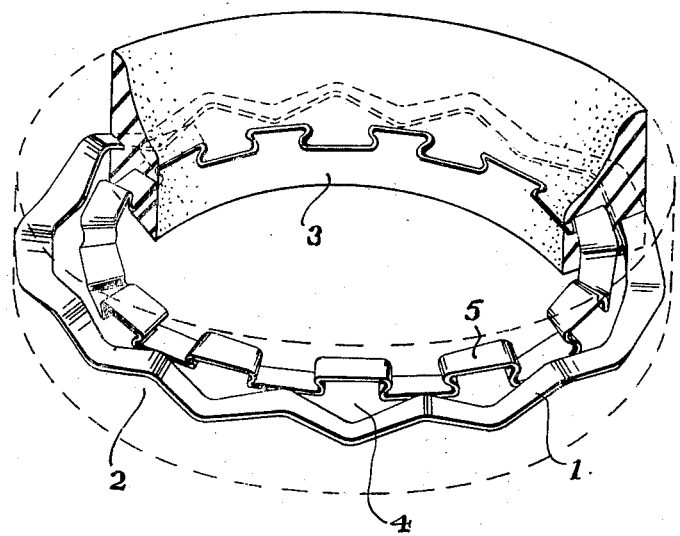
Figure 5 is a perspective view partly in section of a modified construction.

In carrying the invention into effect according to the construction illustrated in Figures 1 and 2 of the drawings, an endless strip of metal 1 is provided, which is formed, as by pressing or in any other suitable manner, as a lengthwise series of transverse recesses or corrugations 2. The recesses on the one face of the packing alternate with the corresponding recesses on the other face. 3 is the ring of rubber or other soft deformable substance having like physical characteristics, in which the metal ring 1 is embedded.

On pressure being applied to the end faces of the packing, the recesses or corrugations in the metal ring are flattened and the outside diameter thereby increased, until contact is made between the outer peripheral cylindrical surface of the reinforcing ring and the inner peripheral surface of the cylinder or gland in which it is mounted.

In Figures 3 and 4 of the drawings, a construction is shown where a contraction of the internal diameter of the deformable packing takes place. The packing according to the modification may be used for example on a rod extending through a gland. In this construction a ring 1 is formed from a strip or band of metal and pressed or otherwise formed to provide a transverse series of alternate oppositely directed recesses 4, of dovetail cross-section, whereby the alternate recesses 4 have flat faces 5, respectively disposed at alternative positions externally and internally of the ring 1, whereby corresponding recesses of the same section alternate at the internal and external faces 5 of the ring 1. On pressure being applied across the interrupted external and internal faces 5 of the ring the said opposite faces 5 are brought nearer together, whereby the cross-section of the ring flattens out, and the internal diameter of the strip 1 and of the ring 3 are contracted. This decrease in the internal diameter of the ring 3 continues until its inner edge comes into contact with the external periphery of the rod, whereby the clearance space between the rod and the gland is thus closed, and effective support is imparted to the flexible sealing packing at the end or ends. As shown in the accompanying drawings the reinforcing rings are moulded or otherwise embedded in the rubber or like packing with the outer edge (in the case of the expanding packing), and with the inner edge (in the case of the contracting packing) in the outer and inner peripheral surfaces respectively of the packing.

In cases where provision is required for both the expansible and contractible forms of the reinforcing rings, the two constructions illustrated in the drawings may be combined as shown in Figure 5, and an expansible ring of corrugated form may be disposed around the external periphery of a contractible ring.

Reinforcing rings according to the invention may also be used to reinforce the annular sealing lips of flexible sealing packing or to form a scraping edge.

Thus it will be understood that the metal rings serve both as a reinforcement to prevent deformation of the packing on pressure being applied and as a means of urging the packing, on pressure being applied, in a direction to ensure an effective seal.

I claim:

1. A composite sealing packing comprising an annular block made of a soft deformable material, an endless resilient metal strip embedded as an annular element in said block in a plane normal to a plane passing through the longitudinal axis of the block, said strip being shaped to present a series of transverse corrugations with adjacent recesses of said corrugations disposed on opposite sides of said strip, and with the longitudinal sections of the strip inclined relatively to said axis whereby pressure applied in the direction of the longitudinal axis of the block tends to flatten said strip and causes a change in the effective circumference of the block.

2. A composite sealing packing comprising an annular block made of a soft deformable material, an endless resilient metal strip embedded as an annular element in said block in a plane normal to a plane passing through the longitudinal axis of the block, said strip being shaped to present a series of adjacent transverse corrugations of dove-tail cross-section with the adjacent recesses of the corrugations disposed on opposite sides of said strip and with longitudinal sections of the strip inclined relatively to said axis whereby pressure applied in the direction of the longitudinal axis of the block tends to flatten said strip and causes a decrease in the effective inner circumference of the block.

3. A composite sealing packing comprising an annular block made of a soft deformable material, an endless resilient metal strip embedded as an annular element in said block in a plane normal to a plane passing through the longitudinal axis of the block, said strip being shaped to present a series of transverse wave-like corrugations of V-section with adjacent recesses of the corrugations disposed on opposite sides of said strip and with the longitudinal sections of the strip inclined relatively to said axis, a second resilient metal strip embedded as an annular element in said block and lying adjacent said first strip in a plane normal to a plane passing through the longitudinal axis of the block and shaped to present a series of transverse corrugations of dove-tail cross-section with the adjacent recesses of the corrugations disposed on opposite sides of said strip and with the longitudinal sections of the strip inclined relatively to said axis whereby pressure applied in the direction of the longitudinal axis of the block tends to flatten said strip and causes a decrease in the inner circumference of said block and an increase in the outer circumference thereof.

4. A composite sealing packing comprising an annular block made of a soft deformable material, an endless resilient metal strip embedded as an annular element in said block in a plane normal to a plane passing through the longitudinal axis of the block and with the longer circumferential edge of said strip in the outer periphery of the block, said strip being shaped to present a series of transverse wave-like corrugations of V-section with the adjacent recesses of the corrugations disposed on opposite sides of said strip and with the longitudinal sections of the strip inclined relatively to said axis whereby pressure applied in the direction of the longitudinal axis of the block tends to flatten said strip and causes an increase in the outer circumference of said block.

5. A composite sealing packing comprising an annular block made of a soft deformable material, an endless resilient metal strip embedded as an annular element in said block in a plane normal to a plane passing through the longitudinal axis of the block and with the shorter circumferential edge of said strip in the inner periphery of the block, said strip being shaped to present a series of transverse corrugations of dove-tail section with the adjacent recesses of the corrugations disposed on opposite sides of said strip and with the longitudinal sections of the strip inclined relatively to said axis whereby pressure applied in the direction of the longitudinal axis of the block tends to flatten said strip and causes a decrease in the inner circumference of said block.

LEWIS MERVYN CECIL SEAMARK.

REFERENCES CITED

The following references are of record in the file of this patent:

UNITED STATES PATENTS

| Number | Name | Date |
|---|---|---|
| 926,841 | Bartlett | July 6, 1909 |
| 2,069,212 | Buffington | Feb. 2, 1937 |
| 2,182,051 | Kurth | Dec. 5, 1939 |
| 2,210,833 | Clough | Aug. 6, 1940 |
| 2,325,556 | Taylor et al. | July 27, 1943 |
| 2,368,380 | Ruzicka | Jan. 30, 1945 |
| 2,455,202 | Ware | Nov. 30, 1948 |